United States Patent [19]
Janssen

[11] 3,711,965
[45] Jan. 23, 1973

[54] EDUCATIONAL TOY FOR TEACHING ARITHMETIC

[76] Inventor: Eldon L. Janssen, 3815 Los Feliz Blvd, Apt. 1, Los Angeles, Calif. 90027

[22] Filed: June 18, 1970

[21] Appl. No.: 47,457

[52] U.S. Cl. ..................................35/31 D, 35/70
[51] Int. Cl. ...............................G09b 23/02
[58] Field of Search.........35/31 D, 31 F, 31 G, 35 H, 35/30 R, 70; 273/153 R; 46/1 A, 20

[56] References Cited

UNITED STATES PATENTS 2,304,893  12/1942  Dickson................................35/31 D
2,971,275  2/1961  Provenzano..........................35/31 D

FOREIGN PATENTS OR APPLICATIONS 997,145  6/1964  Great Britain........................35/31 D

*Primary Examiner*—Jerome Schnall
*Attorney*—Fulwider, Patton, Rieber, Lee & Utecht

[57] ABSTRACT

An arithmetical teaching toy for division and multiplication employing a board having numbered dividend areas thereon and separate divisor pieces to be interlocked with the board areas by means of a peg and hole arrangement. Each numbered piece and numbered area has a corresponding number of pegs or holes arranged so that only the pieces whose numbers are divisors of a particular area may be individually inserted into and interlocked therewith, the peg insertion physically illustrating the arithmetic concept that the divisor piece number "goes into" the dividend area number. The exterior outline of the pieces is such that two or more given divisor pieces can interlock with a given dividend area only if the product of the piece numbers is not greater than the number of the area.

11 Claims, 11 Drawing Figures

PATENTED JAN 23 1973
3,711,965
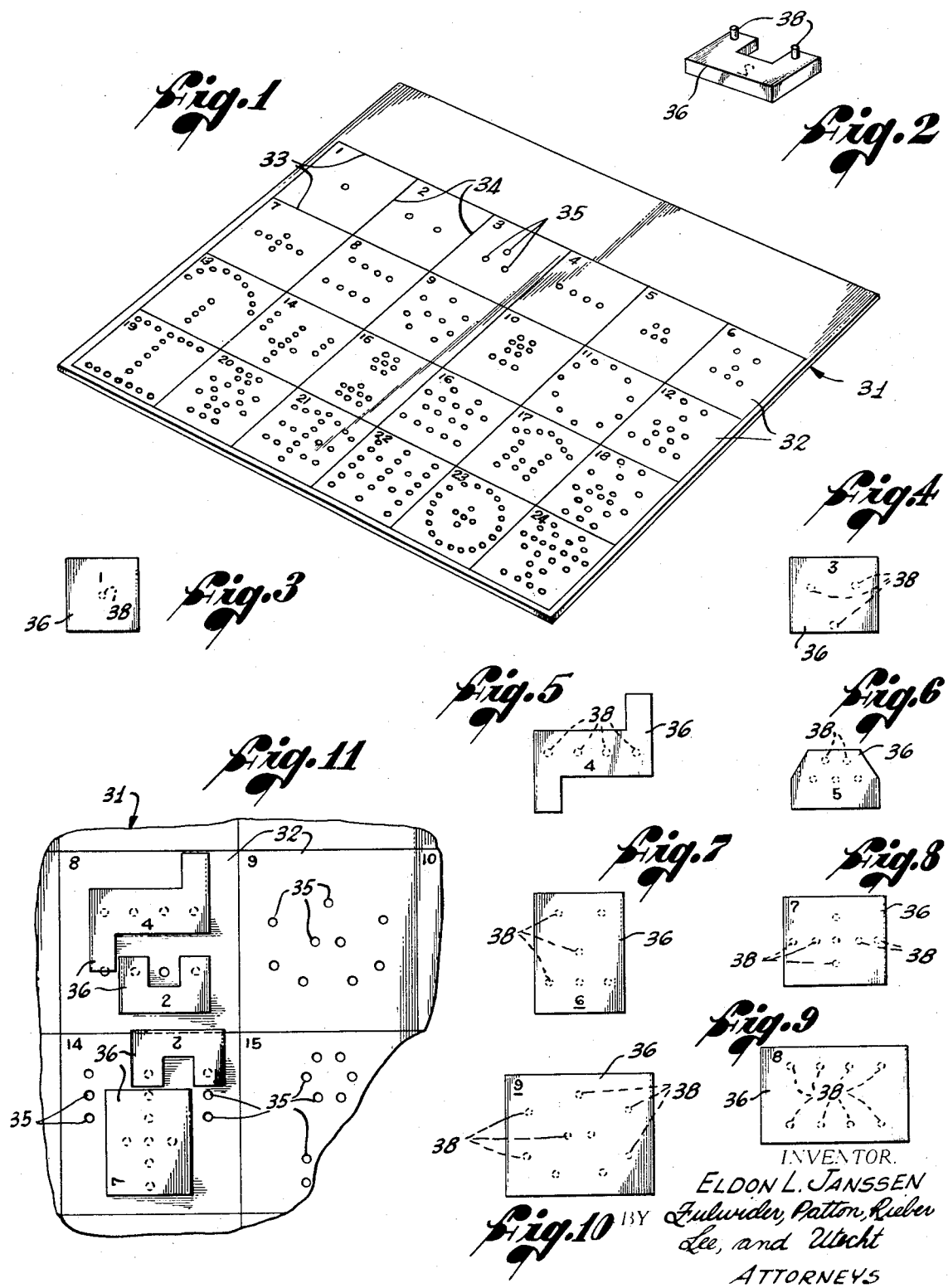
INVENTOR.
ELDON L. JANSSEN
BY Fulwider, Patton, Rieber, Lee, and Utecht
ATTORNEYS 3,711,965

EDUCATIONAL TOY FOR TEACHING ARITHMETIC

BACKGROUND OF THE INVENTION

1. This invention relates to the field of educational game-type toys, more particularly for teaching arithmetical concepts.

2. Educational toys of various kinds to aid in the teaching of arithmetic to children have been suggested in the past for substantially all the arithmetical concepts and have been of varying value in transmitting such concepts. Such toys to perform the function for which they are provided must interest the child, provide a challenge which he can master without too much difficulty and preferably illustrate by association the arithmetical concept which it is desired to transmit. The arithmetical educational toys of the prior art have succeeded only partially in these requirements where division, multiplication and associated concepts are concerned, and the educational toy of the present invention is particularly adapted to the transmittal of the "goes into" concept of division and, by extension thereof, to multiplication and other related concepts.

SUMMARY OF THE INVENTION

The primary objective for the educational toy of the present invention is to assist the child in grasping the basic concepts of division, multiplication and related arithmetical problems. For this purpose a game-type board is provided having areas thereon which are successively numbered with dividend numbers, for example 1 through 24.

To cooperate with this board are separate pieces which interlock with the appropriate numbered areas thereon and which are numbered with the divisor numbers 1 through 9. The number of pieces having the same divisor number is preferably equal to the maximum number of times that number will "go into" any of the dividend numbers on the board.

Both the board areas and the pieces not only have their respective numbers marked directly on them, but have interlocking elements, such as holes or pegs therein or thereon, the number of elements for each piece or area corresponding to the piece or area number. The holes and pegs are arranged in complementary locations so that a numbered piece may interlock with or "go into" the holes of only those areas having dividend numbers into which the numbers of the piece may be evenly divided. Moreover, the pieces have exterior outlines which, together with the peg and hole arrangement, enable two or more divisor pieces to be located together in complementary fashion in a given dividend area only if the product of the piece numbers is not greater than the area number. While the interlocking elements may be mounted on either the board or the pieces, it is preferred that the board have the female elements (holes) and the pieces the male elements (pegs) so as to transmit to the child the divisional concept that the divisor numbers "go into" the dividend numbers by having the divisor piece pegs physically going into the proper numbered area holes on the board. Having two divisor pieces fill a board area and prevent other divisor pieces plugging into that area, the concept that one numbered piece "goes into" the number of the board area an even number of times corresponding to the number of the other divisor piece, not only conveys to the child the divisional concept, but by an extension thereof, the multiplication concept as well, since if the number of one piece "goes into" the dividend number the times of the number of another piece then the multiplication of one piece number by the number of the other equals the dividend number.

Likewise, the educational toy of this invention demonstrates the concept of series multiplication, may be used also to demonstrate a limited concept of exponents, and also demonstrates the concept of prime numbers divisible only by themselves or by one.

To aid the child in locating the pegs of the piece in the board holes, the pieces are preferably made of transparent plastic material while the pegs are of opaque material or may be colored to make them more readily apparent when viewed through the material of the piece. The child operator can therefor see the relationship between the pegs on the piece and the holes in the board as he attempts to have a given piece "go into" a particular board area.

BRIEF DESCRIPTION OF THE DRAWINGS

FIG. 1 is a perspective view of the dividend board of the present invention.

FIG. 2 is a perspective view of the back of a divisor piece numbered 2, according to the present invention.

FIG. 3 is a plan view of the divisor piece numbered 1.

FIGS. 4 through 10 are plan views of the divisor pieces 3 through 9, respectively.

FIG. 11 is a partial plan view of the dividend board of FIG. 1 showing arithmetical problems solved by the association of the proper divisor pieces with the board areas numbered 8 and 14.

DESCRIPTION OF THE PREFERRED EMBODIMENT

The educational toy of the present invention, in the specific exemplification illustrated in the drawing, comprises a game-type board 31 of any desired material having substantially equal areas 32 marked thereon by horizontal lines 33 and vertical lines 34. The areas 32 are preferably consecutively numbered from left to right and from top to bottom by dividend numbers, there being herein shown 24 areas identified by dividend numbers 1 through 24. The areas are provided with holes 35, which are the same in number as the number of the area in which they appear, and which are preferably arranged in a pleasing, more or less regular, configuration, as permitted by the desirability of each particular dividend area receiving only those divisor pieces 36 whose numbers "go into" the number of the area.

A divisor piece 36 for the number 2 is shown in bottom perspective in FIG. 2, and has two pegs 38, corresponding to the divisor number of the piece, and is of general U-shape for cooperation with the other pieces. FIGS. 3 through 10 show divisor pieces 36 which are numbered 1 and 3 through 9 respectively, and which have pegs 38 extending from their back, equal in number to the divisor number of the piece. The body of each piece 36 is of a transparent plastic, such as lucite, and the pegs 38 are of opaque or colored material to be more readily discerned through the transparent body material, from the top thereof. The holes 35 and pegs 38 are arranged in complementary locations so that a numbered piece may interlock with or "go into" the holes of only those areas 32 having dividend numbers into which the number of the piece may be evenly divided. The total number of divisor pieces 36 provided having the same divisor number is preferably equal to the maximum number of times that number will "go into" any of the dividend numbers on the board.

It will be seen that the divisor pieces 36 are of various configurations from the square of that numbered 1, through various rectangular shapes, and the irregular shapes of the numbers 2, 4 and 5. The various pieces 36 are so shaped so that a plurality of pieces 36 will be properly located together with respect to a dividend area 32 on the board 31, not only by the complementary locations of the holes 35 and pegs 38, but also as dictated by the configurations of the pieces themselves. To this end, the piece exterior outlines either complement one another to permit their location together in a given area or interfere with one another to prevent their association in a given area. Therefore, plural divisor pieces are locatable together within a dividend area only when both the hole and peg locations and the piece outlines are compatible.

FIG. 11 shows the location of the divisor pieces numbered 2 and 4 in the dividend area numbered 8, to demonstrate that the number 2 "goes into" the number 8 four times, or, vice-versa, and that the number 4 "goes into" the number 8 two times. Similarly, the divisor pieces 2 and 7 are shown mounted in the divided area 14, likewise indicating the number 7 "goes into" the number 14 twice, or that the number 2 "goes into" the number 14 seven times. The divisor pieces will interlock with a selected dividend area only if the divisor number is evenly divisible into the dividend number. For a plurality of two or more divisor pieces to interlock together in the same dividend area, the product of the plural divisor numbers must be not greater than the dividend number.

By having the projections or pegs on the pieces physically "going into" complementary openings in the board, the toy of this invention demonstrates the rudiments of division physically by having the numbered divisor piece physically "going into" the numbered dividend area. It is believed that this is the most significant of the educational aspects of the toy and the reasons why in this application the numbers of the pieces have been referred to as divisors and the numbers of the board areas as dividends. It is but a slight extension of the concept of division to reach the converse multiplication concept. Thus, since 7 "goes into" 14 two times, then 7 times 2 equals 14.

The educational toy of this invention also demonstrates, to limited extents, the concepts of series multiplication, such as 2 × 3 × 4 equals 24 since the divisor pieces 36 for numbers 2, 3, and 4 fit together in the dividend area 32 for number 24, and the concept of exponents such as 2 × 2 × 2 equals 8, equals 2 to the exponent 3 since three divisor pieces for number 2 fit together in the dividend area for number 8. The toy of this invention also illustrates the concept of prime numbers which are divisible only by themselves or by 1, such as 2, 3, 5, 7, etc., wherein only the piece having the divisor number corresponding to the number of the dividend area may be received therein and, further, that the piece with the number 1 will obviously "go into" all of the areas.

Therefore it can be seen that the educational toy of the present invention provides interest and a challenge to the child user in fitting the proper divisor pieces into the dividend areas, and that the physical act of having the piece "go into" the area conveys the concept of the number of the piece going into the area number to assist the child in grasping the divisional concept. By extension, the concept of multiplication becomes easy, and other related concepts may be learned, or at least the meaning thereof may be suggested, and while a certain preferred embodiment of the invention has been specifically illustrated and described it will be understood that the invention is not limited thereto as many variations will be apparent to those skilled in the art, and the invention is to be given its broadest interpretation within the terms of the following claims.

I claim:

1. An educational toy comprising:
   a game-type board;
   a plurality of areas outlined on the surface of said board;
   a plurality of numbers individually applied to said areas;
   first attachment means applied to said areas in numbers equal to the number of the area in which they are located;
   a plurality of separate pieces;
   individual numbers applied to said pieces;
   second attachment means on said pieces equal in number to the number applied thereto, said first and second attachment means being complementary to mount the pieces in the areas;
   said attachment means cooperating to permit location of a piece in an area only when the number of the area is evenly divisible by the number of the piece.

2. The educational toy defined in claim 1 in which said areas are numbered 1 through 24, and said pieces are numbered 1 through 9.

3. The educational toy defined in claim 1 in which said second attachment means is received within said first attachment means to mount a piece on the board so as to physically convey the concept that the number of the piece "goes into" the number of the area.

4. The educational toy defined in claim 3 in which said first attachment means are holes and said second attachment means are pegs extending from the backs of said pieces and complementary to and received within said holes.

5. The educational toy defined in claim 4 in which said pieces have transparent body portions and opaque or colored pegs, so that the pegs are readily discernable through the pieces to show their cooperation with the holes in the board.

6. The educational toy defined in claim 3 in which at least certain of said pieces have different exterior outlines to prevent a plurality of given pieces being mounted in a given area unless the product of the numbers of the pieces is not greater than the number of the area.

7. The educational toy defined in claim 6 in which said areas are numbered from left to right and from top to bottom from 1 through 24 and said pieces are numbered from 1 through 9 and in which the number of pieces of a given number is at least equal to the maximum number of times the number of the piece may be evenly divided into any number on the board.

8. The educational toy defined in claim 1 in which certain of said pieces are duplicated for a given number by the number of times that given number is divisible into any number on the board.

9. The educational toy defined in Claim 1 in which which said first and second attachment means determine, by their cooperation, whether a single piece may be located in a given numbered area, at least certain of said pieces having different exterior outlines, and the pieces by their compatible or repugnant exterior outlines determine whether a plurality of pieces may be located together on the numbered area regardless of whether each piece may be individually locatable on that area.

10. The educational toy defined in claim 9 in which said first attachment means are holes in said board and said second attachment means are pegs extending from the backs of said pieces and complementary to and received within said holes to physically convey the concept that the number of the piece "goes into" the number of the area, and wherein a plurality of said pieces though individually locatable on an area are prevented by their exterior outlines from disposition together on the area unless the product of the numbers of the pieces is not greater than the number of the area.

11. The educational toy defined in claim 10 in which said pieces have transparent body portions and opaque or colored pegs, so that the pegs are readily discernable through the pieces to show their cooperation with the holes in the board.

* * * * *